(12) United States Patent
Okumura et al.

(10) Patent No.: US 7,790,647 B2
(45) Date of Patent: Sep. 7, 2010

(54) CATALYST LAYER FOR POLYMER ELECTROLYTE FUEL CELL, PROCESS FOR PRODUCING THE CATALYST LAYER, AND POLYMER ELECTROLYTE FUEL CELL

(75) Inventors: Yoshinobu Okumura, Machida (JP); Kazuhiro Yamada, Yokohama (JP); Kazuya Miyazaki, Atsugi (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 807 days.

(21) Appl. No.: 11/552,867

(22) Filed: Oct. 25, 2006

(65) Prior Publication Data

US 2007/0099066 A1    May 3, 2007

(30) Foreign Application Priority Data

Oct. 27, 2005  (JP)  ............................. 2005-313400

(51) Int. Cl.
*B01J 31/00*  (2006.01)
*B01J 31/28*  (2006.01)
*B01J 27/20*  (2006.01)
*H01M 4/58*  (2010.01)
*H01M 4/02*  (2010.01)
*H01M 8/00*  (2010.01)

(52) U.S. Cl. .......................... 502/103; 429/27; 429/40; 502/101; 502/104; 502/113

(58) Field of Classification Search .................. 429/30, 429/33, 40–44, 27; 324/754; 564/1, 302; 427/115; 502/100–104, 113
See application file for complete search history.

(56) References Cited

U.S. PATENT DOCUMENTS

| | | | |
|---|---|---|---|
| 4,044,193 A | 8/1977 | Petrow et al. | |
| 4,136,059 A | 1/1979 | Jalan et al. | |
| 5,882,810 A * | 3/1999 | Mussell et al. | ................. 429/33 |
| 6,160,178 A * | 12/2000 | Riechers et al. | ............. 564/302 |
| 7,189,472 B2 * | 3/2007 | Suenaga et al. | ................ 429/44 |
| 2001/0011897 A1 * | 8/2001 | Hamel et al. | ................. 324/754 |

(Continued)

FOREIGN PATENT DOCUMENTS

JP    2002-110182 A    4/2002

(Continued)

OTHER PUBLICATIONS

Shinichi Hirano et al., "High Performance Proton Exchange Membrane Fuel Cells with Sputter-Deposited Pt Layer Electrodes," 42 Electrochimca Acta 1587-93 (1997).

*Primary Examiner*—Dah-Wei D Yuan
*Assistant Examiner*—Claire L Rademaker
(74) *Attorney, Agent, or Firm*—Fitzpatrick, Cella, Harper & Scinto (57) ABSTRACT

An electrode catalyst layer, capable of having high catalytic activity in a small thickness, for use in a polymer electrolyte fuel cell having an entangled (cobweb-like) structure. The electrode catalyst layer is produced through a process including a step of forming a thin film with a film-forming material containing a combination of platinum, oxygen, and nitrogen, a combination of platinum, oxygen, and boron, or a combination of platinum, oxygen, nitrogen, and boron, and a step of forming a catalyst material, which has the entangled structure and principally contains platinum as a main component by reducing the film-forming material.

9 Claims, 6 Drawing Sheets

U.S. PATENT DOCUMENTS

| | | |
|---|---|---|
| 2002/0146615 A1 * | 10/2002 | Yamaura et al. .............. 429/44 |
| 2004/0121219 A1 | 6/2004 | Mei et al. |
| 2004/0142230 A1 | 7/2004 | Katori et al. |
| 2007/0134544 A1 | 6/2007 | Yamada et al. |

FOREIGN PATENT DOCUMENTS

| | | |
|---|---|---|
| JP | 2003-80085 A | 3/2003 |
| JP | 2003-187812 A | 7/2003 |
| JP | 2004-79438 A | 3/2004 |
| WO | 2006/004023 A | 1/2006 |
| WO | 2006/041212 A1 | 4/2006 |

* cited by examiner

CATALYST LAYER FOR POLYMER ELECTROLYTE FUEL CELL, PROCESS FOR PRODUCING THE CATALYST LAYER, AND POLYMER ELECTROLYTE FUEL CELL

FIELD OF THE INVENTION AND RELATED ART

The present invention is related to a catalyst layer for a polymer electrolyte fuel cell, a process for producing the catalyst layer, and a polymer electrolyte fuel cell having the catalyst layer.

A fuel cell produces less noise and vibration and hardly generates harmful emissions. Also, the fuel cell is capable of directly converting chemical energy of the fuel into electrical energy. For the reasons such as efficient generation of electricity and excellent environmental compatibility, the fuel cell is expected to be a new-generation energy system. Especially, since a polymer electrolyte fuel cell is actuated at a low temperature and has advantages in that it is compact, light in weight, and easy to handle, the development of the polymer electrolyte fuel cell has proceeded toward commercialization in a wide variety of fields, including automotive, residential power cogeneration, portable use, etc.

The polymer electrolyte fuel cell uses, as an electrolyte, a solid polymer PEM (proton exchange membrane), which is permeable to a proton ($H^+$) and is constituted by a membrane electrode assembly (MEA) including the PEM at both sides of which a fuel electrode provided with a catalyst layer and an air electrode provided with a catalyst layer are laminated. Hydrogen supplied to the fuel electrode dissociates into a hydrogen ion (proton) and an electron on the catalyst material. At the air electrode, supplied oxygen reacts with the proton moved through the PEM and the electron moved through an external circuit to form water. In this manner, the electron moves through the external electrode, so that current flows in a direction opposite to a flow direction of the electron, thus providing electrical energy.

Electrogeneration reactions occurring on the respective electrode catalyst layers are shown below.

FUEL ELECTRODE $H_2 \rightarrow 2H^+ + 2e^-$     (1)

AIR ELECTRODE $2H^+ + \frac{1}{2}O_2 + 2e^- \rightarrow H_2O$     (2)

The air electrode is supplied with an oxygen-containing gas, such as air. However, a reduction reaction of oxygen at the air electrode is slower than an oxidation reaction of hydrogen at the fuel electrode, so that the oxidation-reduction reaction at the air electrode is a rate-determining step in a cell reaction. For this reason, development of high-activity air electrode catalyst material is important in improving electrical power generation efficiency of the fuel cell.

Conventionally, as an electrode catalyst material for the fuel cell, a catalyst material in which platinum fine particles have an average particle size of approximately several nanometers and are three-dimensionally dispersed and carried on a carbon carrier, such as carbon black carrier, has been used. With respect to the high activity of the air electrode catalyst material, attempts to further enhance a coefficient of use of the catalyst material by increasing a surface area of the platinum catalyst material carried on the carbon carrier have been made (e.g., as described in U.S. Pat. Nos. 4,044,193 and 4,136,059).

Further, an attempt to decrease an amount of platinum carried on a carrier by forming a catalyst layer with a very small thickness of approximately several micrometers to facilitate substance transport and concentrate the catalyst layer in the neighborhood of an electrolyte membrane has also been made (S. Hirano, J. Kim and S. Srinivasan, "Electrochim Acta", 42, 1587 (1997)).

Particularly, in the case where the fuel cell is mounted in small-sized electrical equipment, the fuel cell itself is required to be reduced in size. For this reason, many studies have been conducted with respect to a method of supplying air from through holes to an air electrode by natural diffusion without using a pump or a blower (e.g., as described in Japanese Laid-Open Patent Application (JP-A) 2002-110182). In this method, in many cases, substance transport at the air electrode is a reaction rate-determining factor, so that it is considered that thinning of the catalyst layer is effective.

Therefore, in order to realize a further improvement in performance of the fuel cell to be mounted in the small-sized electrical equipment, it has been required to provide an electron conduction channel and a sufficient gas channel and ensure a high activation of platinum.

As a method of forming a thin catalyst layer, a method of forming a platinum film on a surface of an electrolyte membrane by sputtering has also been attempted. However, this method has a deficiency in that gas permeability is poor due to a dense membrane. In other words, not only is the gas channel not provided, but there is also a deficiency in that the catalyst layer is cracked by the expansion of the electrolyte membrane when the thickness of the catalyst layer is increased. Further, a method of forming a catalyst layer at a surface of a carbon electrode by sputtering or plating has also been attempted. However, the electrode surface is rough, so that a large amount of the catalyst material cannot contact an electrolyte membrane. As a result, high performance has not been obtained.

For improving the catalyst function of platinum, addition of at least one element selected from boron, oxygen, and nitrogen within an amount of 10 wt. % to an alloy having a face-centered cubic crystal structure or rhombohedral crystal structure has been proposed (JP-A 2003-187812). This material has a platinum content of 28 wt. % or less and a concentration of a metal element constituting the catalyst material other than platinum is high. Further, in an operational condition of a fuel cell, a catalyst material constituting a metal element other than platinum is selectively dissolved in an electrolyte and the resultant alloying element ion dissolved in the electrolyte is deposited on the interface between the electrolyte and the catalyst layer. As a result, cell performance deteriorates.

Further, conducting a nitrifying treatment of a platinum-containing alloy in a temperature range of 200-1000° C. in a gas atmosphere at a partial pressure of $NH_3$ of 5.065 kPa or more has been proposed to improve catalytic properties (JP-A 2004-79438). In this method, the high-temperature treatment has been effected, so that grain growth of platinum alloy particles occurs. As a result, there is a problem in that it is difficult to obtain the platinum alloy particles on a nanometer scale. Furthermore, the catalyst function improvement cannot be effectively achieved unless the platinum alloy contains nitrogen in an amount of at least 2 at. % (atomic percent).

Also, there has been proposed an alloy catalyst material of platinum with boron as an additive, which is thermally solid-insoluble in platinum, carried on the electroconductive powder (JP-A 2003-80085). Boron is added in an amount of 2-70 at. %, but addition of boron oxide is not described.

SUMMARY OF THE INVENTION

An object of the present invention is to provide an electrode catalyst layer capable of having a high catalytic activity while having a small thickness.

Another object of the present invention is to provide a process for providing the electrode catalyst layer and a fuel cell using the electrode catalyst layer.

According to an aspect of the present invention, there is provided an electrode catalyst layer for a polymer electrolyte fuel cell comprising a catalyst layer having an entangled structure or a cobweb-like (spiderweb-like) structure.

The electrode catalyst layer may preferably have a multi-layer structure including at least one layer having the entangled structure.

The catalyst material having the entangled structure can be obtained by reducing platinum oxynitride or a mixture of platinum and an oxynitride of a metal element other than platinum. The resultant catalyst material having the entangled structure may preferably be platinum; a platinum-containing multi-metal element; a mixture of platinum and platinum oxynitride; a mixture of platinum and an oxynitride of a metal element other than platinum; a mixture of a platinum-containing multi-metal element and an oxynitride of a metal element other than platinum; or a mixture of platinum, platinum oxynitride, and an oxynitride of a metal element other than platinum.

The catalyst material having the entangled structure can also be obtained by reducing a mixture of platinum oxide and boron oxide or a mixture of boron oxide and a complex oxide of platinum and a metal element other than platinum. The resultant catalyst material having the entangled structure may preferably be a mixture of platinum and boron oxide; a mixture of a platinum-containing metal element and boron oxide; a mixture of platinum, an oxide of a metal element other than platinum, and boron oxide; or a mixture of a platinum-containing multi-metal element, an oxide of a metal element other than platinum, and boron oxide.

The catalyst material having the entangled structure can also be obtained by reducing a mixture of platinum oxynitride and boron oxide or a mixture of boron oxide and a complex oxynitride of platinum and a metal element other than platinum. The resultant catalyst material having the entangled structure may preferably be a mixture of platinum and boron oxide; a mixture of a platinum-containing a metal element and boron oxide; a mixture of platinum, platinum oxynitride, and boron oxide; a mixture of platinum, an oxynitride of a metal element other than platinum, and boron oxide; a mixture of a platinum-containing metal element, an oxynitride of a metal element other than platinum, and boron oxide; or a mixture of platinum, platinum oxynitride, an oxynitride of a metal element other than platinum, and boron oxide.

The metal element other than platinum may preferably be at least one metal element selected from the group consisting of Al, Si, Ti, V, Cr, Mn, Fe, Co, Ni, Cu, Zn, Ge, Zr, Nb, Mo, Ru, Rh, Pd, Ag, In, Sn, Hf, Ta, W, Os, Re, Ir, Au, La, Ce and Nd.

The entangled structure may preferably comprise a filiform tissue or texture having a width of 3 nm or more and 100 nm or less. The filiform tissue is constituted by filiform elements.

The catalyst material having the entangled structure may preferably have a porosity of 30% or more and 95% or less.

The catalyst material having the entangled structure may preferably be disposed on a catalyst carrier.

The catalyst carrier may preferably comprise a material selected from the group consisting of carbon, carbon-supported platinum, a carbon-supported platinum alloy, platinum black, platinum fine particles, platinum alloy fine particles, and gold fine particles.

According to a first aspect of the process for producing the electrode catalyst layer, there is provided a production process of a catalyst layer for a polymer electrolyte fuel cell (solid polymer fuel cell). The production process includes a step of forming a film of platinum oxynitride or a mixture of complex oxynitride of platinum and a metal element other than platinum by a reactive vacuum deposition method. The production process also includes a step of reducing the platinum oxynitride or the mixture of a complex oxynitride of platinum and a metal element other than platinum. The production process further includes a step of forming a catalyst layer, which has the entangled structure and which comprises platinum, a platinum-containing metal element or a mixture containing platinum. Examples of the mixture include a mixture of platinum and platinum oxynitride, a mixture of platinum and oxynitride of a metal element other than platinum, a mixture of platinum-containing multi-metal element and an oxynitride of a metal element other than platinum, and a mixture of platinum, platinum oxynitride, and an oxynitride of a metal element other than platinum.

According to a second aspect of the process for producing the electrode catalyst layer, there is provided a production process of a catalyst layer for a polymer electrolyte fuel cell. The production process includes a step of forming a thin film of a mixture of platinum oxide and boron oxide or a mixture of boron oxide and a complex oxide of platinum and a metal element other than platinum by a reactive vacuum deposition method. The production process also includes a step of reducing the mixture of platinum oxide and boron oxide or the mixture of the boron oxide and the complex oxide of platinum and the metal element other than platinum. The production process further includes a step of forming a catalyst layer, which has the entangled structure and which comprises a platinum-containing mixture. Examples of the mixture include a mixture of platinum and boron oxide, a mixture of a platinum-containing metal element and boron oxide, a mixture of boron oxide, platinum, and an oxide of a metal element other than platinum, and a mixture of boron oxide and oxide of a platinum-containing multi-metal element and a metal element other than platinum.

According to a third aspect of the process for producing the electrode catalyst layer, there is provided a production process of a catalyst layer for a polymer electrolyte fuel cell. The production process includes a step of forming a thin film of a mixture of platinum oxynitride and boron oxide or a mixture of boron oxide and a complex oxynitride of platinum and a metal element other than platinum by a reactive vacuum deposition method. The production process also includes a step of reducing the mixture of platinum oxynitride and boron oxide or the mixture of the boron oxide and the complex oxynitride of platinum and the metal element other than platinum. The production process further includes a step of forming a catalyst layer, which has the entangled structure and which comprises platinum-containing mixture. Examples of the mixture include a mixture of platinum and boron oxide; a mixture of a platinum-containing metal element and boron oxide, a mixture of platinum, platinum oxynitride, and boron oxide; a mixture of platinum, an oxynitride of a metal element other than platinum, and boron oxide; a mixture of boron oxide, a platinum-containing metal element, and an oxynitride of a metal element other than platinum, and a mixture of boron oxide and an oxynitride of platinum, platinum oxynitride, and a metal element other than platinum.

In the above-described production processes, the metal element other than platinum may preferably be at least one metal element selected from the group consisting of Al, Si, Ti, V, Cr, Mn, Fe, Co, Ni, Cu, Zn, Ge, Zr, Nb, Mo, Ru, Rh, Pd, Ag, In, Sn, Hf, Ta, W, Os, Re, Ir, Au, La, Ce and Nd.

In the above-described reactive vacuum deposition method, a vapor-deposited atom may preferably have a mean free path of 1 cm or less.

According to a further aspect of the present invention, there is provided a polymer electrolyte fuel cell, comprising:

a solid polymer electrolyte membrane;

a pair of electrodes between which the solid polymer electrolyte membrane is disposed; and two electrode catalyst layers each disposed between the solid polymer electrolyte membrane and an associated electrode;

wherein at least one of the two electrode catalyst layers is the electrode catalyst layer described above.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENT

In the electrode catalyst layer for the polymer electrolyte fuel cell according to the present invention, the above-described platinum-containing mixture has a minute structure on the order of nanometers during a mixture-forming step. By reducing the mixture in a hydrogen-containing atmosphere, grain growth of platinum particles during the reduction is suppressed by the presence of nitrogen or boron. For this reason, it is possible to prepare a catalyst material having an entangled structure constituted by the particles on the order of nanometers. Examples of the catalyst material include platinum; a platinum-containing multi-metal element; a mixture of platinum and platinum oxynitride; a mixture of a platinum-containing multi-metal element and an oxynitride of a metal element other than platinum; a mixture of platinum, platinum oxynitride, and an oxynitride of a metal element other than platinum; a mixture of platinum and boron oxide; a mixture of a platinum-containing metal element and boron oxide; a mixture of platinum, an oxide of a metal element other than platinum, and boron oxide; a mixture of a platinum-containing multi-metal element, an oxide of metal element other than platinum, and boron oxide; a mixture of platinum, platinum oxynitride, and boron oxide; a mixture of platinum, an oxynitride of metal element other than platinum, and boron oxide; a mixture of a platinum-containing metal element, an oxynitride of a metal element other than platinum, and boron oxide; and a mixture of platinum, platinum oxynitride, an oxynitride of a metal element other than platinum, and boron oxide. By the above-described reduction, the platinum oxide or platinum oxynitride as a principal constituting compound of the mixtures before the reduction is reduced to platinum. As a result, it is possible to prepare a porous film having such an entangled structure or cobweb-like structure that small through holes (minute pores) having a pore size of several tens of nanometers to approximately 200 nm are formed in a thickness direction of a film formed of the mixture.

The thus prepared porous film is dipped into an electrolytic solution to form an electrolytic film at surfaces of platinum nanoparticles as a principal constituting compound of the porous film, so that electrolytic channels are effectively formed at the surfaces of platinum nanoparticles. Further, it is possible to prepare a catalyst layer having such an entangled structure that a catalyst reaction area is large and sufficient electron conduction channels and gas channels are ensured.

According to the present invention, the catalyst layer is provided with a characteristic entangled structure, so that it is possible to improve the catalytic activity having to a catalyst utilization rate. Further, the thickness of the catalyst layer can be made small, so that it is possible to improve a substance transport performance in the catalyst layer. Further, it is possible to provide a fuel cell, which is advantageous in terms of production costs, by using a reactive vacuum deposition method, which is a simple production process, such as reactive sputtering, reactive electron beam deposition, or reactive ion plating.

According to the present invention, the catalyst layer has the entangled structure or the multi-layer structure including at least one layer having the entangled structure, so that it is possible to enhance the catalytic activity and the catalyst utilization rate. Further, the catalyst material in the present invention can be used suitably for a catalyst electrode of a fuel cell with improved substance transport performance to be mounted in small-sized electric equipment, particularly suitable for an air electrode catalyst.

Further, the catalyst layer production process of the present invention is capable of realizing a catalyst layer for a polymer electrolyte fuel cell at a low cost by employing steps that are simple, inexpensive, and reproducible. Further, the catalyst layer has the entangled structure or the multi-layer structure including at least one layer having the entangled structure, so that the catalyst layer is not readily cracked.

Hereinbelow, preferred embodiments of the present invention will be described more specifically with reference to the drawings. In the following description, however, materials, dimensions, shapes, relative arrangements, and the like of the structural members usable in the present invention are not limited to those described below unless otherwise specified. Similarly, a production process described below is not an exclusive embodiment.

Figure 1:
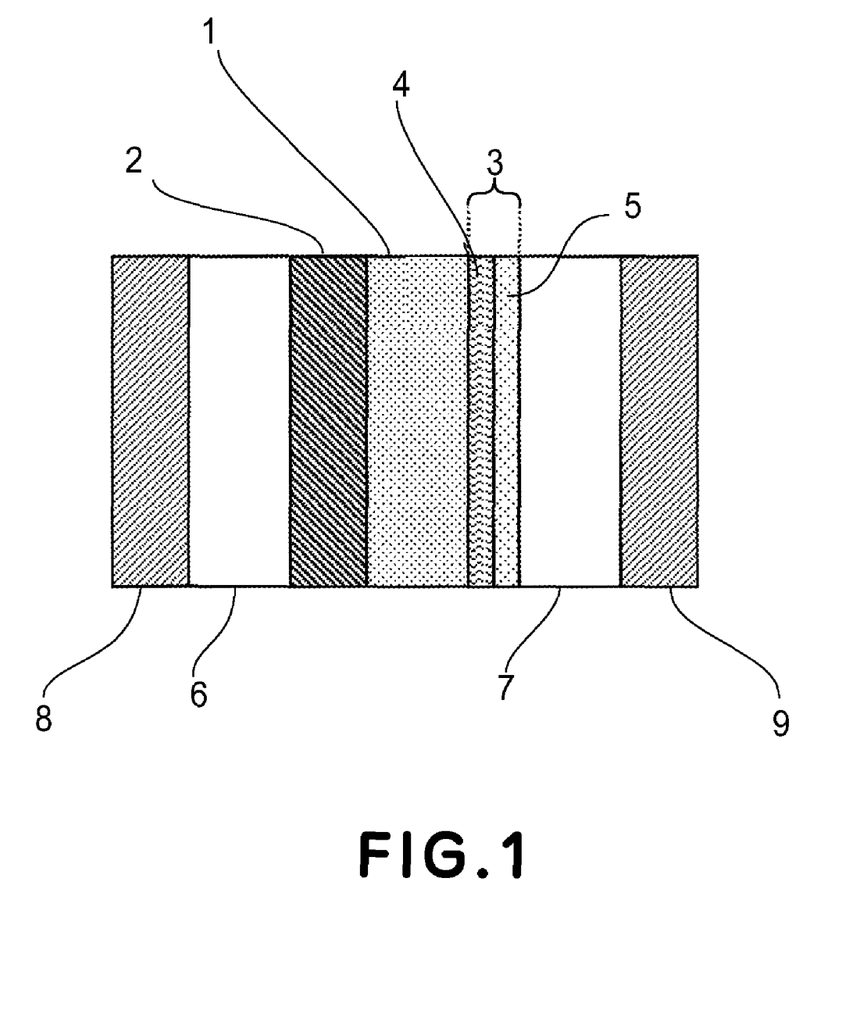
FIG. 1 is a schematic view showing an embodiment of a cross-sectional constitution of a single cell of a polymer electrolyte fuel cell produced by using the electrode catalyst layer according to the present invention.

FIG. 1 is a schematic view showing an embodiment of a cross-sectional constitution of a single cell of a polymer electrolytic fuel cell prepared by using the catalyst layer of the present invention.

In FIG. 1, reference numeral 1 represents a solid polymer electrolytic membrane. A pair of catalyst layers, i.e., an anode-side catalyst layer 2 (fuel electrode side) and a cathode-side catalyst layer 3 (air electrode side) including a catalyst material 4 having the entangled structure or the multi-layer structure including at least one layer having the entangled structure is disposed so as to sandwich the electrolytic membrane 1. In this embodiment, as shown in FIG. 1, only the cathode-side catalyst layer 3 (air-electrode side) has the entangled structure or the multi-layer structure including at least one layer having the entangled structure. However, in the present invention, it is also possible to appropriately select various configurations including the one where only the anode-side catalyst layer has the entangled structure or the multi-layer structure including at least one layer having the entangled structure.

The above-described catalyst layer 3 is constituted by the catalyst material 4 having the entangled structure or the multi-layer structure including at least one layer having the entangled structure and a catalyst carrier 5 for supporting the catalyst material 4. Outside the anode-side catalyst layer 2, an anode-side gas diffusion layer 6 and an anode-side layer 8 are disposed.

A cathode-side gas diffusion layer 7 and a cathode-side layer 9 are disposed outside the cathode-side catalyst layer 3.

As a material for the solid polymer electrolytic membrane 1, it is possible to suitably use a perfluorosulfonic acid polymer having such a structure that a side chain having a terminal sulfonic acid group is connected to a fluorocarbon skeleton. For example, it is possible to use a polymer comprising teflon (registered trademark) to which a sulfonic acid group is connected. More specifically, a Nafion (registered trade mark) membrane may suitably be used.

The perfluorosulfonic polymer has a fluorocarbon skeleton that is not cross-linked and has a crystal structure formed by skeleton portions connected by Van der Waals forces. Further, some sulfonic acid groups are agglomerated to form an inverted micelle structure, which is used as a proton ($H^+$) conduction channel.

Incidentally, when the proton ($H^+$) is moved toward the cathode side in the electrolytic membrane, it is moved through the medium of a water molecule. Therefore, the electrolytic membrane also has the function of holding water molecule.

Accordingly, as the functions of the solid polymer electrolyte membrane, it is required that the proton ($H^+$) produced on the anode side be transferred to the cathode side and that the electrolytic membrane not be permeable to unreacted reactive gases (hydrogen and oxygen) and have a predetermined water-retaining function. So long as these requirements are fulfilled, it is possible to selectively use any electrolytic membrane.

The gas diffusion layers 6 and 7 not only sufficiently supply fuel gas or air uniformly in an in-plane direction to an electrode reaction area of a fuel electrode or an air electrode, but also dissipate electric charges generated by an anode electrode reaction toward the outside of the single cell in order to effect the electrode reaction efficiently. Further, the diffusion layers have the function of efficiently discharging the reaction product water or unreacted gas toward the outside of the single cell. As a material for the gas diffusion layer, it is possible to preferably use an electron-conductive porous material, such as carbon cloth or carbon paper.

Regarding the function of the catalyst carrier 5, there are improvements in its catalytic activity as a promoter, keeping of shape of the catalyst material 4 having the entangled structure, ensuring of electron-conductive channel, and an increase in specific surface area, etc. As a material for the catalyst carrier 5, it is possible to preferably use, e.g., carbon black, platinum-supported carbon, platinum alloy-supported carbon, platinum block, platinum fine particles, or gold fine particles.

Generally, in order to obtain a high-performance catalyst layer, an interface between the catalyst material and the electrolytic material is required to be sufficiently large and communication of electrode reaction substances (reaction gas, hydrogen ion, electron) must be sufficiently ensured, i.e., that a three-phase interface is effectively formed. The catalyst layer 4 having the entangled structure used in the present invention is characterized in that the catalyst material is provided with the entangled structure to form through holes along a direction of an electron conduction channel while ensuring an electrolytic channel and electron conduction channel, thus ensuring a sufficient gas channel.

Figure 2:
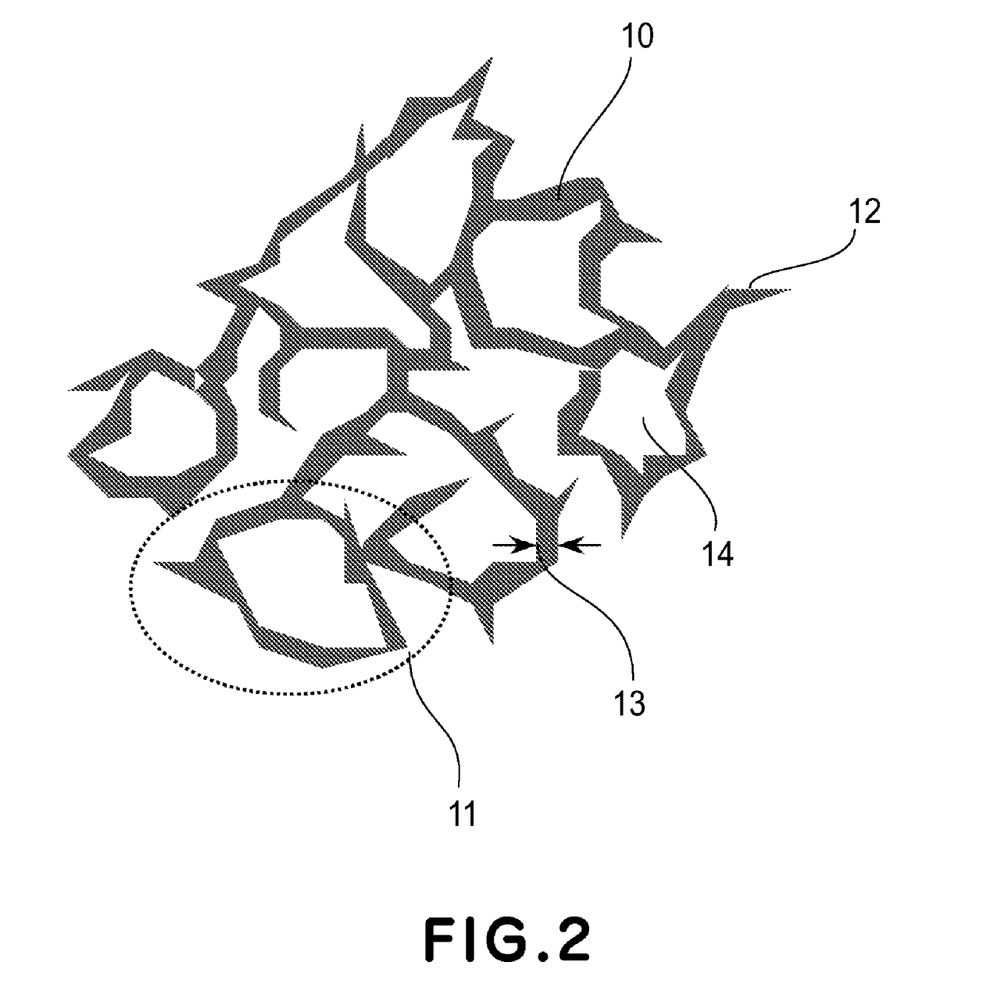
FIG. 2 is an enlarged schematic view showing a part of an entangled structure (cobweb-like structure) of a catalyst material used in the present invention.

FIG. 2 is a schematic enlarged view of a part of the catalyst material having the entangled structure contained in the electrode catalyst layer.

As shown in FIG. 2, the entangled structure is constituted by a branched filiform tissue or texture 10 and through holes or pores 14. Further, the filiform tissue 10 is constituted by filiform elements including a looped portion 11 and a needle-like portion 12. In the entangled structure, the branched filiform tissue has a width (or thickness) of 3 nm or more and 100 nm or less, preferably 3 nm or more and 60 nm or less.

Further, the catalyst material 4 having the entangled structure or the multi-layer structure including at least one layer having the entangled structure has a porosity of 30% or more and 95% or less, preferably 55% or more and 75% or less, with respect to the entangled structure.

Incidentally, the porosity means a ratio of a volume occupied by the pore portion to an apparent volume of the entangled-structured catalyst layer and is represented by [1−(actual volume of entangled-structured catalyst material))/(special volume between electrolytic membrane and catalyst carrier)]×100(%).

The catalyst carrier 5 has a thickness of 200 nm or less, preferably 5 nm or more and 50 nm or less.

Figure 3:
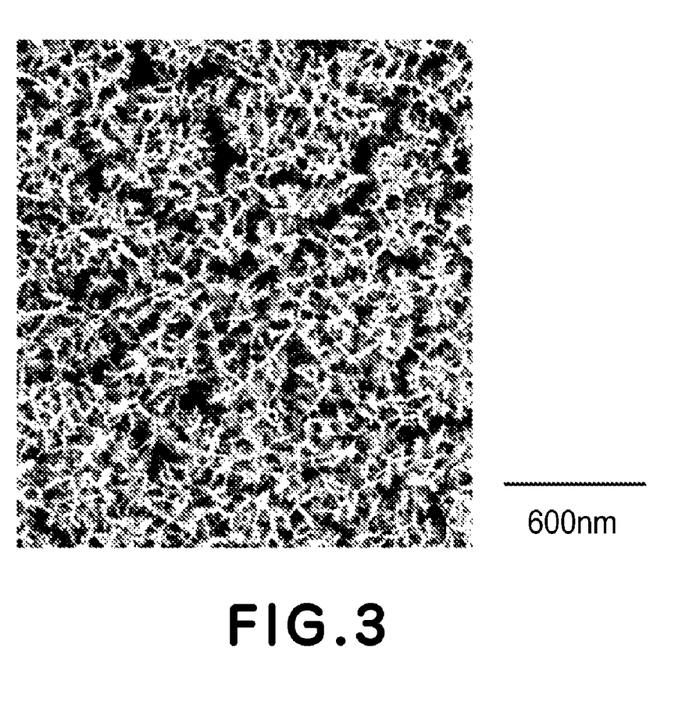
FIG. 3 is a photograph taken by a scanning electron microscope (SEM) (magnification: 50,000) of a surface of a platinum catalyst layer having an entangled structure obtained by reducing a platinum oxynitride film having an entangled structure, prepared through reactive sputtering in an argon-oxygen-nitrogen atmosphere, in a helium-hydrogen gas atmosphere.
Figure 4:
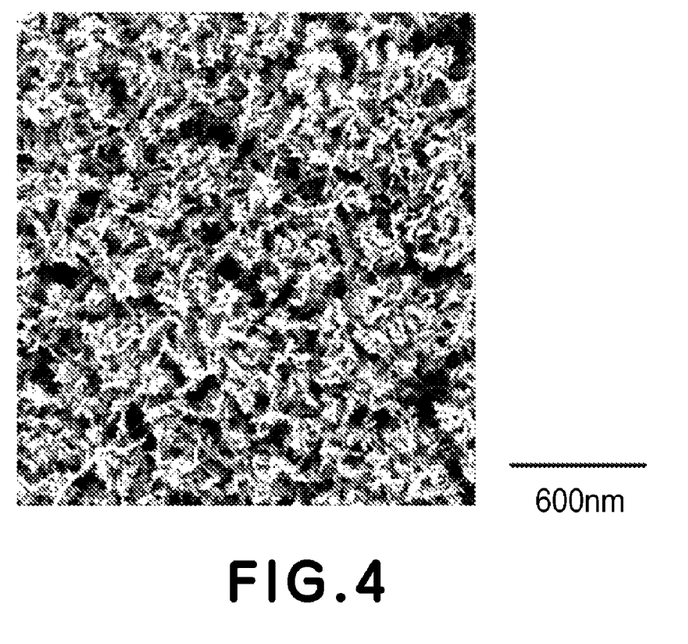
FIG. 4 is a photograph taken by an SEM (magnification: 50,000) of a surface of $Pt_{98}B_1O_1$ catalyst layer having an entangled structure in the present invention, wherein the catalyst layer is obtained by reducing a platinum-boron alloy oxide film having an entangled structure, prepared through reactive sputtering in an argon-oxygen atmosphere, in a helium-hydrogen gas atmosphere.

FIGS. 3 and 4 are photographs (magnification: 50,000) taken by a scanning electron microscope (SEM) showing a planar thin film of the catalyst material 4 having the entangled structure.

In FIG. 3, the catalyst material having the entangled structure is platinum and the catalyst carrier material is gold.

Further, the solid polymer electrolytic membrane is formed of Nafion 112 (trade name), and the catalyst material having the entangled structure is prepared through reaction sputtering. As shown in the SEM photograph of FIG. 3, the catalyst material having the entangled structure is constituted by the branched filiform tissue having a width of 3 nm or more and 50 nm or less.

In FIG. 4, the catalyst material having the entangled structure is a mixture of platinum and boron oxide, and the catalyst carrier is a carbon black layer. Further, the solid polymer electrolytic membrane is formed of Nafion 112 (trade name), and the catalyst material having the entangled structure is prepared through reaction sputtering. The catalyst material 4 having the entangled structure comprises platinum; a platinum-containing multi-metal element; a mixture of platinum and platinum oxynitride; a mixture of platinum and an oxynitride of a metal element other than platinum; a mixture of a platinum-containing multi-metal element and an oxynitride of a metal element other than platinum; or a mixture of platinum, platinum oxynitride, and an oxynitride of a metal element other than platinum.

The catalyst material 4 having the entangled structure also comprises a mixture of platinum and boron oxide; a mixture of platinum-containing metal element and boron oxide; a mixture of platinum, an oxide of a metal element other than platinum, and boron oxide; or a mixture of a platinum-containing multi-metal element, an oxide of a metal element other than platinum, and boron oxide. The catalyst material 4 having the entangled structure further comprises a mixture of platinum, platinum oxynitride, and boron oxide; a mixture of platinum, an oxynitride of a metal element other than platinum, and boron oxide; a mixture of a platinum-containing metal element, an oxynitride of a metal element other than platinum, and boron oxide; or a mixture of platinum, platinum oxynitride, an oxynitride of a metal element other than platinum, and boron oxide.

The metal element other than platinum can be at least one metal element selected from the group consisting of Al, Si, Ti, V, Cr, Mn, Fe, Co, Ni, Cu, Zn, Ge, Zr, Nb, Mo, Ru, Rh, Pd, Ag, In, Sn, Hf, Ta, W, Os, Re, Ir, Au, La, Ce and Nd.

The above-described platinum oxynitride is a nonstoichiometric compound and can be represented by the following compositional formula:

$PtO_{1-a}N_{1-b}$ ($0 < a < 2.0$ and $0 \leq b \leq 0.8$).

Further, the above-described boron oxide is also a nonstoichiometric compound and can be represented by the following compositional formula:

$BO_{1-c}$ ($0 \leq c \leq 1.5$).

A composition ratio between platinum and a metal element other than platinum cannot be uniquely identified in terms of an upper limit and a lower limit.

In the present invention, with respect to platinum-containing multi-metal element; a mixture of platinum and an oxynitride of a metal element other than platinum; a mixture of a platinum-containing multi-metal element; a mixture of platinum, platinum oxynitride, and an oxynitride of metal element other than platinum; a mixture of a platinum-containing metal element and boron oxide; a mixture of platinum, an oxide of a metal element other than platinum, and boron oxide; a mixture of a platinum-containing multi-metal element, an oxide of a metal element other than platinum, and boron oxide; a mixture of a platinum-containing multi-metal element and boron oxide; a mixture of platinum, an oxynitride of a metal element other than platinum, and boron oxide; a mixture of a platinum-containing metal element, an oxynitride of a metal element other than platinum, and boron oxide; and a mixture of platinum, platinum oxynitride, an oxynitride of a metal element other than platinum, and boron oxide, an atomic concentration ratio between platinum (Y) and the metal element (X) other than platinum may preferably satisfy the following relationship:

$$30 \leq 100Y/(X+Y).$$

When a value of $100Y/(X+Y)$ is less than 30, a proportion of platinum is decreased. As a result, a high activity of the catalyst material cannot be achieved.

It has been found that the reason why the above-described mixtures form the entangled structure is associated with both film-forming conditions including oxygen partial pressure, supplied power, substrate temperature, etc., and a surface roughness of a base material. In the case where these conditions are not satisfied, the resultant structure is a plate-like structure, an agglomerated structure of fine particles or a dense columnar structure with few pores. For this reason, even in the case where the atomic concentration ratio between platinum (Y) and a metal element (X) other than platinum satisfies $30 \leq 100Y(X+Y)$, when both of the above-described conditions (the film-forming conditions and the surface roughness of base material) are not satisfied, the entangled structure cannot be obtained as described above.

In the present invention, the surface roughness of base material may preferably be 0.1-10 µm.

Further, it may also preferably be 0.1 to 10 times the thickness of the above-described platinum-containing mixture to be formed.

In the present invention, before the reduction, the above-described platinum oxynitride or a mixture of a complex oxynitride of platinum and a metal element other than platinum has the entangled structure. It is possible to easily prepare a film or membrane having the entangled structure by using a platinum target through reactive sputtering in an inert gas atmosphere containing oxygen and nitrogen. It is also possible to easily prepare the film having the entangled structure through vacuum vapor deposition in a broad sense, such as reactive electron beam deposition or reactive ion plating, in addition to the reactive sputtering.

The film having the entangled structure capable of being prepared by reducing the film having the entangled structure comprising platinum oxynitride or a complex oxynitride of platinum and a metal element other than platinum has a nitrogen content of 0.5 at. % or less per platinum. Examples of the film having the entangled structure include a platinum film; a platinum-containing multi-metal element film; a film containing platinum and platinum oxynitride; a film containing platinum and an oxynitride of a metal element other than platinum; a film containing a platinum-containing multi-metal element and an oxynitride of a metal element other than platinum; a film containing platinum, platinum oxynitride, and an oxynitride of a metal element other than platinum; a film containing platinum, platinum oxynitride, and boron oxide; a film containing platinum, an oxynitride of a metal element other than platinum, and boron oxide; a film containing a platinum-containing metal element, an oxynitride of a metal element other than platinum, and boron oxide; and a film containing platinum, platinum oxynitride, an oxynitride of a metal element other than platinum, and boron oxide.

It is possible to prepare a film having the entangled structure via the reduction with a nitrogen content of more than 0.5 at. % per platinum. However, this film is too dense, since it has been prepared in the atmosphere of an inert gas containing oxygen and nitrogen before the reduction. Accordingly, during the reduction, hydrogen cannot permeate the entire film, so that platinum oxynitride in the film is not reduced to platinum and is, therefore, present in an oxynitride state.

In the present invention, before the reduction, the mixture of platinum oxide and boron oxide, the mixture of boron oxide and a complex oxide of platinum and a metal element other than platinum, the mixture of platinum oxynitride and boron oxide, or the mixture of boron oxide and a complex oxynitride of platinum and a metal element other than platinum has the entangled structure. The film having the entangled structure can be easily prepared by the reactive sputtering. The target used is a platinum target and a boron target or a platinum-boron alloy target. Further, the sputtering atmosphere is an atmosphere of an inert gas containing oxygen or an atmosphere of an inert gas containing oxygen and nitrogen. It is also possible to easily prepare the film having the entangled structure through the vacuum deposition method in a broad sense, such as the reactive electron beam deposition or reactive ion plating, in addition to the reactive sputtering.

As described above, the mixture of platinum oxide and boron oxide, the mixture of boron oxide and the complex oxide of platinum and the metal element other than platinum, the mixture of platinum oxynitride and boron oxide, or the mixture of boron oxide and the complex oxynitride of platinum and the metal element other than platinum has the entangled structure.

The film having the entangled structure capable of being prepared by reducing the film having the entangled structure has a boron content of 3 at. % or less per platinum. Examples of the film having the entangled structure include a film containing platinum and boron oxide; a film of a platinum-containing multi-metal element and boron oxide; a film containing platinum, an oxide of a metal element other than platinum, and boron oxide; and a film containing a platinum-containing multi-metal element, an oxide of a metal element other than platinum, and boron oxide.

It is possible to prepare a film having the entangled structure with a boron content of more than 3 at. % per platinum via the reduction. However, such a film is too dense, since it has been prepared in the atmosphere of an inert gas containing oxygen or the atmosphere of an inert gas containing oxygen and nitrogen before the reduction. For this reason, during the reduction, hydrogen cannot permeate the entire film. Accordingly, platinum oxide or platinum oxynitride in the film is not reduced to platinum and is, therefore, present in the oxide or oxynitride form.

The reduction in the present invention can be effected in an $H_2/He$ atmosphere containing 1% to 5% $H_2$ and under conditions including a pressure of 0.02-0.1 MPa, a temperature from room temperature to 100° C., and a reduction time of 0.5 hour to several hours.

In the present invention, the catalyst layer having the entangled structure may have a thickness of 10 μm or less, preferably 5 μm or less. Further, the catalyst layer having the entangled structure is characterized by having a porosity of 35% or more and less than 75%, preferably 50% or more and less than 75%.

With respect to the thickness of the catalyst layers on the fuel electrode side and the air electrode side, the air electrode-side catalyst layer may preferably have a thickness of 50 μm or less. When the air electrode-side catalyst layer has a thickness of more than 50 μm, diffusion performance of fuel gas at the fuel electrode or air at the air electrode toward the electrode reaction area in the catalyst layer is considerably lowered and emission efficiency of the reaction product water or unreacted gas to the outside of the single cell is also remarkably decreased. Further, proton conduction resistance in the air electrode-side catalyst layer is large, so that the overvoltage of oxygen reduction reaction is increased, thus decreasing cell performance.

A method of forming such a fuel electrode-side structure and air electrode-side structure, each including the gas diffusion layer and the catalyst layer, is not particularly limited. For example, these structures as shown in FIG. 1 can be produced in the following manner.

(1) The air electrode-side catalyst layer is prepared.

On a sheet of polytetrafluoroethylene (PTFE) as a transfer layer for the solid polymer electrolytic membrane, a catalyst carrier of Au is formed by the electron beam deposition. Thereafter, a platinum oxynitride film having the entangled structure is formed in an atmosphere of an inert gas, oxygen, and nitrogen by reactive sputtering. The resultant film is subjected to a hydrogen reduction process to obtain a platinum layer having the entangled structure supported on the catalyst carrier of Au.

Further, the platinum layer is impregnated with a dispersion of a mixture of PTFE and Nafion (trade name, mfd. by DuPont), whereby effective electrolytic channels are formed and an appropriate water-repellent process is effected at the catalyst surface.

(2) The fuel electrode-side catalyst layer is prepared.

On the PTFE sheet similar as to that in (1) described above, a layer of a carbon-supported platinum catalyst is formed by a doctor blade method. In this case, catalyst slurry used is a kneaded mixture of carbon-supported platinum ("Hi SPEC 4000", mfd. by Johnson Matthey Plc), Nafion, PTFE, isopropyl alcohol (IPA), and water.

(3) A solid polymer electrolytic membrane ("Nafion 112", mfd. by DuPont) is sandwiched between the above-prepared pair of catalyst layers so that the PTFE sheets are located outwardly and then is subjected to hot pressing. Thereafter, the PTFE sheets are removed, so that the pair of catalyst layers is transferred onto the solid polymer electrolytic membrane to obtain an assembly of the electrolytic membrane and the pair of catalyst layers.

(4) This assembly is sandwiched between carbon cloth gas diffusion layers ("LT 1400-W", mfd. by E-TEK, Inc.) and is further sandwiched between a fuel electrode and an air electrode to prepare a single cell.

Preferred embodiments of the present invention are specifically described above, but the present invention is not limited thereto. For example, in the above-described embodiments, the polymer electrolyte fuel cell using a single cell is described. However, a polymer electrolyte fuel cell according to the present invention is not limited thereto. It is also possible to use a polymer electrolyte fuel cell having a laminated structure of a plurality of single cells, i.e., a so-called stack structure.

Below, the present invention will be described more specifically based on Examples, but the present invention is not limited to these examples.

Example 1

In this example, a polymer electrolyte fuel cell having a constitution shown in FIG. 1 was prepared in the following manner.

First, an air electrode-side catalyst layer was prepared.

On a PTFE sheet ("NITFLON", mfd. by NITTO DENKO CORP.) as a transfer layer for a solid polymer electrolytic membrane, a 50 nm-thick catalyst carrier of Au was formed by electron beam deposition. Further, a 1000 nm-thick platinum oxynitride film having an entangled structure was formed thereon by reactive sputtering in an inert gas atmosphere containing oxygen and nitrogen. The resultant thin film of platinum oxynitride had a porosity of 60%. Further, an amount of platinum-loadings was 0.38 mg/cm$^2$.

The reactive sputtering was effected under conditions including a total pressure of 4 Pa, an oxygen flow ratio ($Q_{O2}/(Q_{Ar}+Q_{O2}+Q_{N2})$) of 80%, a nitrogen flow rate ($Q_{N2}/(Q_{Ar}+Q_{O2}+Q_{N2})$) of 3%, a substrate temperature of 25° C., and a supplied power of 5.0 W/cm$^2$.

Thereafter, the platinum oxynitride thin film having the entangled structure was subjected to a reduction process at room temperature for 30 minutes under conditions including an atmosphere of 2% H$_2$/He and a pressure of 0.1 MPa, thus obtaining Pt/Au catalyst layer having the entangled structure formed on the catalyst carrier of Au on the PTFE sheet.

The thus obtained Pt/Au catalyst layer was impregnated with a mixture dispersion of PTFE and Nafion to effectively form electrolyte channels at the catalyst surface and appropriately effect a water-repellent process at the catalyst surface.

FIG. 3 shows a high-resolution SEM photograph at the surface of the above-prepared platinum catalyst layer having the entangled structure.

Next, a fuel electrode-side catalyst layer was prepared.

On a PTFE sheet as a transfer layer for the solid polymer electrolytic film, a layer of carbon-supported platinum catalyst was formed by a doctor blade method. In this case, the catalyst slurry used was a kneaded mixture of platinum-supported catalyst material ("HiSPEC 4000", mfd. by Johnson Matthey Plc), Nafion, PTFE, IPA, and water. An amount of platinum-loadings was 0.35 mg/cm$^2$.

Next, a solid polymer electrolytic membrane ("Nafion 112", mfd. by DuPont) was sandwiched between a pair of the above prepared air electrode-side catalyst layer and fuel electrode-side catalyst layer, followed by hot pressing under pressing conditions including a pressure of 8 MPa, a temperature of 150° C., and a pressing time of 1 min.

Then, the PTFE sheets were removed to transfer the pair of catalyst layers onto the solid polymer electrolytic membrane, thus resulting in an assembly of the electrolytic membrane and the pair of catalyst layers.

The resultant assembly was sandwiched between carbon cloth gas diffusion layers ("LT-1400-W", mfd. by E-TEK, Inc.) and further sandwiched between a fuel electrode and an air electrode to prepare a single cell.

Figure 5:
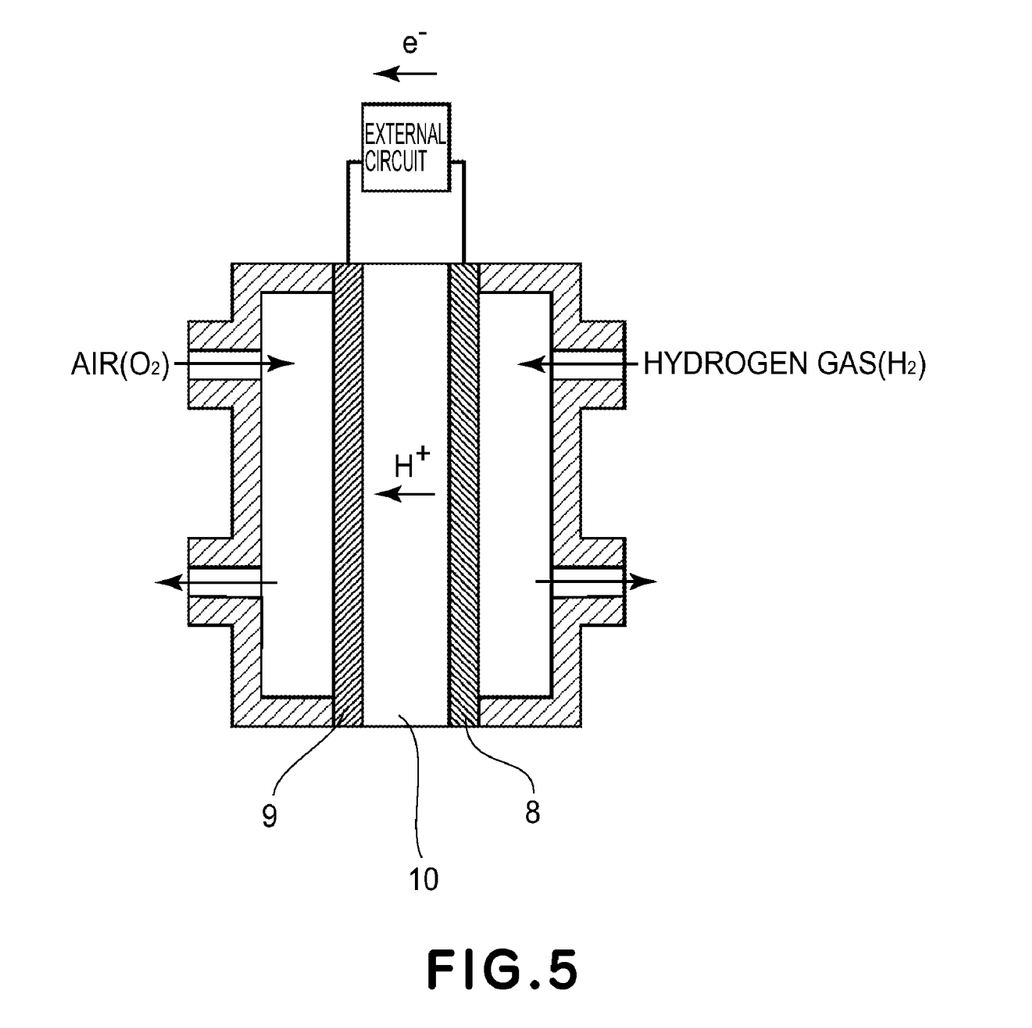
FIG. 5 is a schematic view of an evaluation apparatus of the polymer electrolyte fuel cell.

The thus prepared single cell was evaluated with respect to a cell characteristic by an evaluation apparatus shown in FIG. 5.

Figure 6:
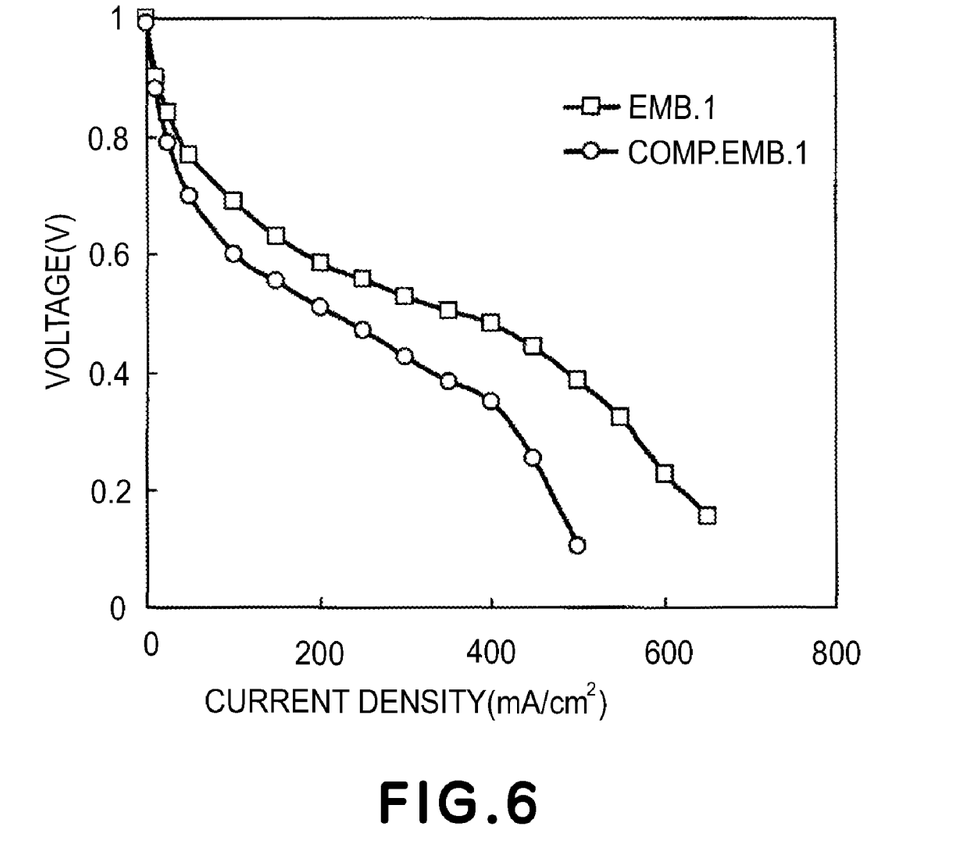
FIG. 6 is a graph showing cell characteristics of polymer electrolyte fuel cells of Example 1 and Comparative Example 1, wherein the polymer electrolyte fuel cell of Example 1 is prepared by using a platinum catalyst layer having the entangled structure on an air electrode side and a platinum-supported carbon catalyst layer on a fuel electrode side, and the polymer electrolyte fuel cell of Comparative Example 1 is prepared by using the platinum-supported carbon catalyst layer on both the air electrode side and the fuel electrode side.

When hydrogen gas was supplied to the fuel electrode-side and air was supplied to the air electrode-side to effect a discharge test at a cell temperature of 80° C., a current-voltage characteristic as shown in FIG. 6 was obtained.

As Comparative Example 1, a single cell was prepared in the same manner as in Example 1, except that the carbon-supported platinum catalyst layer was used on both the fuel electrode side and the air electrode side. In this case, the amount of platinum-loadings was 0.35 mg/cm$^2$ on both the fuel electrode side and the air electrode side.

Current density at 900 my providing a reaction rate-determining area was compared. As a result, the current density was 6.6 mA/cm$^2$ in Example 1 and 2.0 mA/cm$^2$ in Comparative Example 1.

When a limit current area was compared, the current density of the single cell prepared in Example 1 was 650 mA/cm$^2$ or more. On the other hand, in Comparative Example 1, the current density was 530 mA/cm$^2$.

In other words, compared with the catalyst layer in Comparative Example 1, the catalyst layer in Example 1 was capable of considerably preventing the deterioration of cell characteristics due to resistance polarization and diffusion polarization.

Example 2

In this example, a polymer electrolyte fuel cell having a structure shown in FIG. 1 was prepared in the following manner.

First, an air electrode-side catalyst layer was prepared.

As a substrate, a carbon cloth gas diffusion layer ("LT1400-W", mfd. by E-TEK, Inc.) on which carbon black material had been applied in advance was used. On the carbon black material, a 1000 nm-thick film, containing platinum oxide and boron oxide having an entangled structure, was formed by reactive co-sputtering using a platinum target and a boron target in combination in an inert gas atmosphere containing oxygen. The resultant thin film containing platinum oxide and boron oxide had a porosity of 63%. Further, an amount of platinum-loadings was 0.40 mg/cm$^2$.

The reactive co-sputtering was effected under conditions including a total pressure of 4 Pa, an oxygen flow ratio ($Q_{O2}/(Q_{Ar}+Q_{O2}+Q_{N2})$) of 80%, a substrate temperature of 25° C., and a supplied power of 5.0 W/cm$^2$.

Thereafter, the thin film, containing platinum oxide and boron oxide having the entangled structure was subjected to a reduction process at room temperature for 30 minutes under the conditions including an atmosphere of 2% H$_2$/He and a pressure of 0.1 MPa, thus obtaining a Pt$_{98}$B$_1$O$_1$ catalyst layer having the entangled structure formed on the carbon black-applied carbon cloth.

The thus obtained Pt$_{98}$B$_1$O$_1$ catalyst layer was impregnated with a mixture dispersion of PTFE and Nafion to effectively form electrolyte channels at the catalyst surface and appropriately effect a water-repellent process at the catalyst surface.

FIG. 4 shows a high-resolution SEM photograph at the surface of the above prepared Pt$_{98}$B$_1$O$_1$ catalyst layer having the entangled structure.

Next, a fuel electrode-side catalyst layer was prepared.

On a carbon black-applied diffusion layer of carbon cloth ("LI1400-W", mfd. by E-TEK, Inc.), a layer of carbon-supported platinum catalyst was formed by a spray method. In this case, the catalyst slurry used was a kneaded mixture of carbon-supported platinum catalyst material ("HiSPEC 4000", mfd. by Johnson Matthey Plc), Nafion, PTFE, IPA, and water. An amount of platinum-loadings was 0.37 mg/cm$^2$.

Next, a solid polymer electrolytic membrane ("Nafion 112", mfd. by DuPont) was sandwiched between a pair of the above-prepared air electrode-side catalyst layer/diffusion layer and fuel electrode-side catalyst layer/diffusion layer, followed by hot pressing under pressing conditions including a pressure of 8 MPa, a temperature of 150° C., and a pressing time of 1 min., thus resulting in an assembly of the electrolytic membrane and the pair of catalyst layers and the pair of diffusion layers.

The resultant assembly was sandwiched between a fuel electrode and an air electrode to prepare a single cell.

The thus prepared single cell was evaluated with respect to a cell characteristic by an evaluation apparatus shown in FIG. 5.

Figure 7:
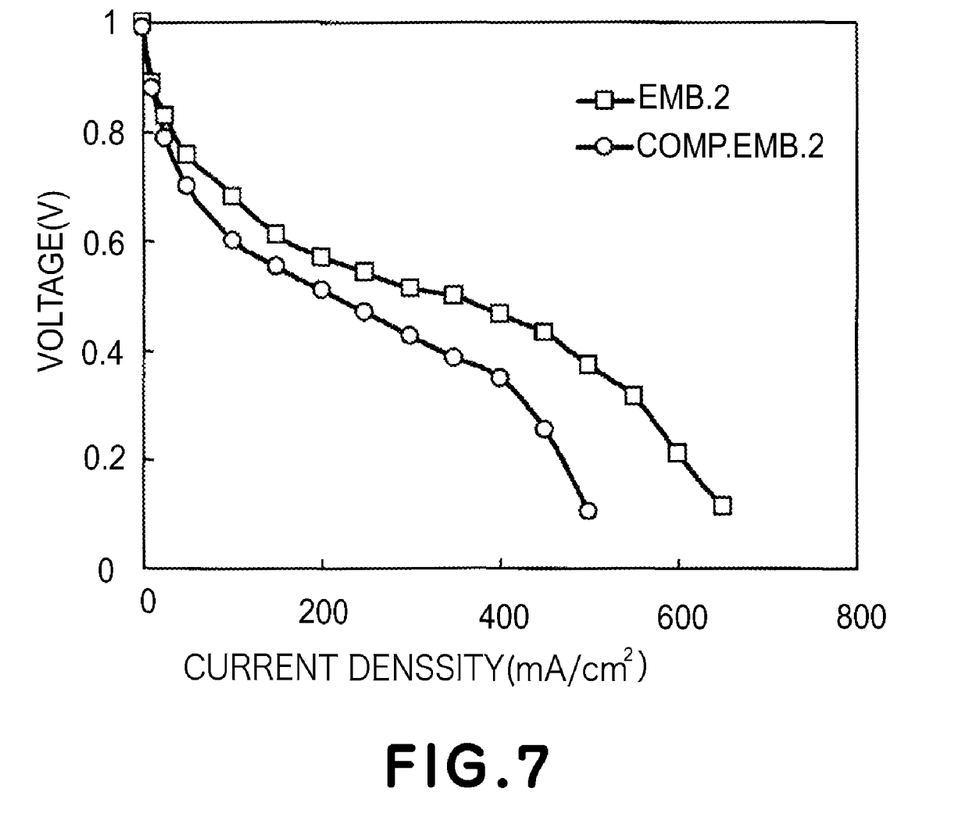
FIG. 7 is a graph showing cell characteristics of polymer electrolyte fuel cells of Example 2 and Comparative Example 1, wherein the polymer electrolyte fuel cell of Example 2 is prepared by using a $Pt_{98}B_1O_1$ catalyst layer having the entangled structure on an air electrode side and a platinum-supported carbon catalyst layer on a fuel electrode side, and the polymer electrolyte fuel cell of Comparative Example 1 is prepared by using the platinum-supported carbon catalyst layer on both the air electrode side and the fuel electrode side.

When hydrogen gas was supplied to the fuel electrode-side and air was supplied to the air electrode-side to effect a discharge test at a cell temperature of 80° C., a current-voltage characteristic as shown in FIG. 7 was obtained.

As Comparative Example 2, a single cell was prepared in the same manner as in Example 2, except that the carbon-supported platinum catalyst layer was used on both the fuel electrode side and the air electrode side. In this case, the amount of platinum-loadings was 0.35 mg/cm$^2$ on both of the fuel electrode side and the air electrode side.

Current density at 900 my providing a reaction rate-determining area was compared. As a result, the current density was 6.4 mA/cm$^2$ in Example 2 and 2.0 mA/cm$^2$ in Comparative Example 2.

When a limit current area was compared, the current density of the single cell prepared in Example 2 was 650 mA/cm$^2$ or more. On the other hand, in Comparative Example 2, the current density was 530 mA/cm$^2$.

In other words, compared with the catalyst layer in Comparative Example 2, the catalyst layer in Example 2 was capable of considerably preventing a deterioration of cell characteristics due to resistance polarization and diffusion polarization.

As described above, according to the present invention, the electrode catalyst layer has a high catalytic activity while having a small layer thickness, so that it is possible to utilize the electrode catalyst layer in a fuel cell to be mounted in, e.g., a small-sized electric equipment.

While the invention has been described with reference to the structures disclosed herein, it is not limited to the details set forth and this application is intended to cover such modifications or changes as may come within the purpose of the improvements or the scope of the following claims.

This application claims priority from Japanese Patent Application No. 313400/2005, filed Oct. 27, 2005, which is hereby incorporated by reference.

What is claimed is:

1. An electrode catalyst layer for a polymer electrolyte fuel cell, comprising:
   a catalyst material, which comprises platinum as a main component and in which platinum or a platinum compound has an entangled structure.

2. A layer according to claim 1, wherein said electrode catalyst layer has a multi-layer structure including at least one layer comprising platinum as a main component and having the entangled structure.

3. A layer according to claim 1, wherein said catalyst material having the entangled structure is selected from the group consisting of platinum; a platinum-containing multi-metal element; a mixture of platinum and platinum oxynitride; a mixture of platinum and an oxynitride of a metal element other than platinum; a mixture of a platinum-containing multi-metal element and an oxynitride of a metal element other than platinum; a mixture of platinum, platinum oxynitride, and an oxynitride of a metal element other than platinum; a mixture of platinum and boron oxide; a mixture of a platinum-containing metal element and boron oxide; a mixture of platinum, an oxide of a metal element other than platinum, and boron oxide; a mixture of a platinum-containing multi-metal element, an oxide of a metal element other than platinum, and boron oxide; a mixture of platinum, platinum oxynitride, and boron oxide; a mixture of platinum, an oxynitride of a metal element other than platinum, and boron oxide; a mixture of a platinum-containing metal element, an oxynitride of a metal element other than platinum, and boron oxide; and a mixture of platinum, platinum oxynitride, an oxynitride of a metal element other than platinum, and boron oxide.

4. A layer according to claim 3, wherein the metal element other than platinum is at least one species of metal element selected from the group consisting of Al, Si, Ti, V, Cr, Mn, Fe, Co, Ni, Cu, Zn, Ge, Zr, Nb, Mo, Ru, Rh, Pd, Ag, In, Sn, Hf, Ta, W, Os, Re, Ir, Au, La, Ce and Nd.

5. A layer according to claim 1, wherein the entangled structure comprises a filiform tissue having a width of 3 nm or more and 100 nm or less.

6. A layer according to claim 1, wherein the catalyst material having the entangled structure has a porosity of 30% or more and 95% or less.

7. A layer according to claim 1, wherein the catalyst material having the entangled structure is disposed on a catalyst carrier.

8. A layer according to claim 7, wherein the catalyst carrier comprises a material selected from the group consisting of carbon, carbon-supported platinum, carbon-supported platinum alloy, platinum black, platinum fine particles, platinum alloy fine particles, and gold fine particles.

9. A polymer electrolyte fuel cell, comprising:
   a membrane electrode assembly, which comprises a solid polymer electrolyte membrane and a pair of electrode catalyst layers disposed on both surfaces of the solid polymer electrolyte membrane,
   wherein at least one of the electrode catalyst layers is an electrode catalyst layer according to claim 1.

* * * * *